E4819 OR 2,632,812

SEARCH ROOM

INVENTOR.
JOHN R. COONEY
BY
Ralph B. Stewart
ATTORNEY

INVENTOR.
JOHN R. COONEY
BY
Ralph B. Stewart
ATTORNEY

Patented Mar. 24, 1953 2,632,812

UNITED STATES PATENT OFFICE 2,632,812

CARRIER-CURRENT INTERCOMMUNICATION APPARATUS

John R. Cooney, Waldoboro, Maine

Application September 6, 1950, Serial No. 183,397

12 Claims. (Cl. 179—2.5)

My invention relates to intercommunication systems and more particularly to systems of the type in which the signal is transmitted as a modulated radio frequency carrier wave transmitted over the same wires which furnish power to the system.

Such systems are broadly old as shown in the United States Patent to Levy 2,114,718 of 1938. In general, they comprise an oscillator, an amplifier, a power supply and a loudspeaker. When conditioned for receiving, the oscillator acts as a detector, and the amplifier merely amplifies the detected signal and feeds it to the voice coil of the loudspeaker. When conditioned for transmitting, the amplifier is used to build up the audio voltage and feeds it to the oscillator where it modulates the oscillator carrier wave, and the modulated carrier wave is then fed to whatever medium is used for a transmission line. Each unit of the system is, therefore, a small compact transceiver.

Systems of this type have not met with a great deal of commercial success due mainly to the noise on the lines caused by other electrical equipment connected to the line, such as power motors, etc. As power-line noise is generally spasmodic, it is not likely to be present during the short periods when actual communication is taking place. While the units are idle, however, they are conditioned for receiving any radio-frequency wave which may appear on the line so that motor noise and the like is apt to produce in their input circuits a series of damped radio-frequency oscillations which are detected and fed to the loudspeakers from which they emerge as sharp cracking sounds. This can be very annoying when the set is left idle for long periods of time, for example, in an office where reasonable quiet is generally preferred.

Accordingly, it is an object of this invention to provide a carrier current intercommunication system which will be relatively free during idle periods of disturbing noises originating in power devices connected to the line. This object of the invention is accomplished by normally biasing an amplifier in the receiving channel to be dead or cut-off, regardless of the presence of noise impulses, and providing bias neutralizing means controlled by an incoming carrier wave for opposing the normal blanking bias and rendering the amplifier effective after a pre-determined delay.

It is a further object of this invention to provide a small, simplified, compact, efficient and inexpensive transceiver unit for use in carrier current intercommunication systems.

One feature of the simplified circuit involves the use of a single oscillatory circuit which tunes very closely to the same frequency whether for transmitting or receiving, by use of a high value of grid-leak, a high grid-excitation voltage, and a value of RC in the grid-leak and condenser combination which allows the oscillator to function at a very small "angle of flow," and at high efficiency. The small angle of flow reduces the necessary phase-shift which would ordinarily cause such an oscillator to transmit well off the resonant frequency of the tuned circuit.

Another feature is the use of a tapped primary winding for coupling the oscillator to the line which allows the set to transmit at low impedance (around 4 ohms) in order to supply appreciable power to the line regardless of any heavy shunting which may be present in the form of appliances, etc., in the vicinity, while presenting a fairly high impedance (to minimize losses in the high series impedance of long lines) when acting as a receiver.

Other objects will be apparent from the following description taken in conjunction with the accompanying drawing in which.

Figure 1:
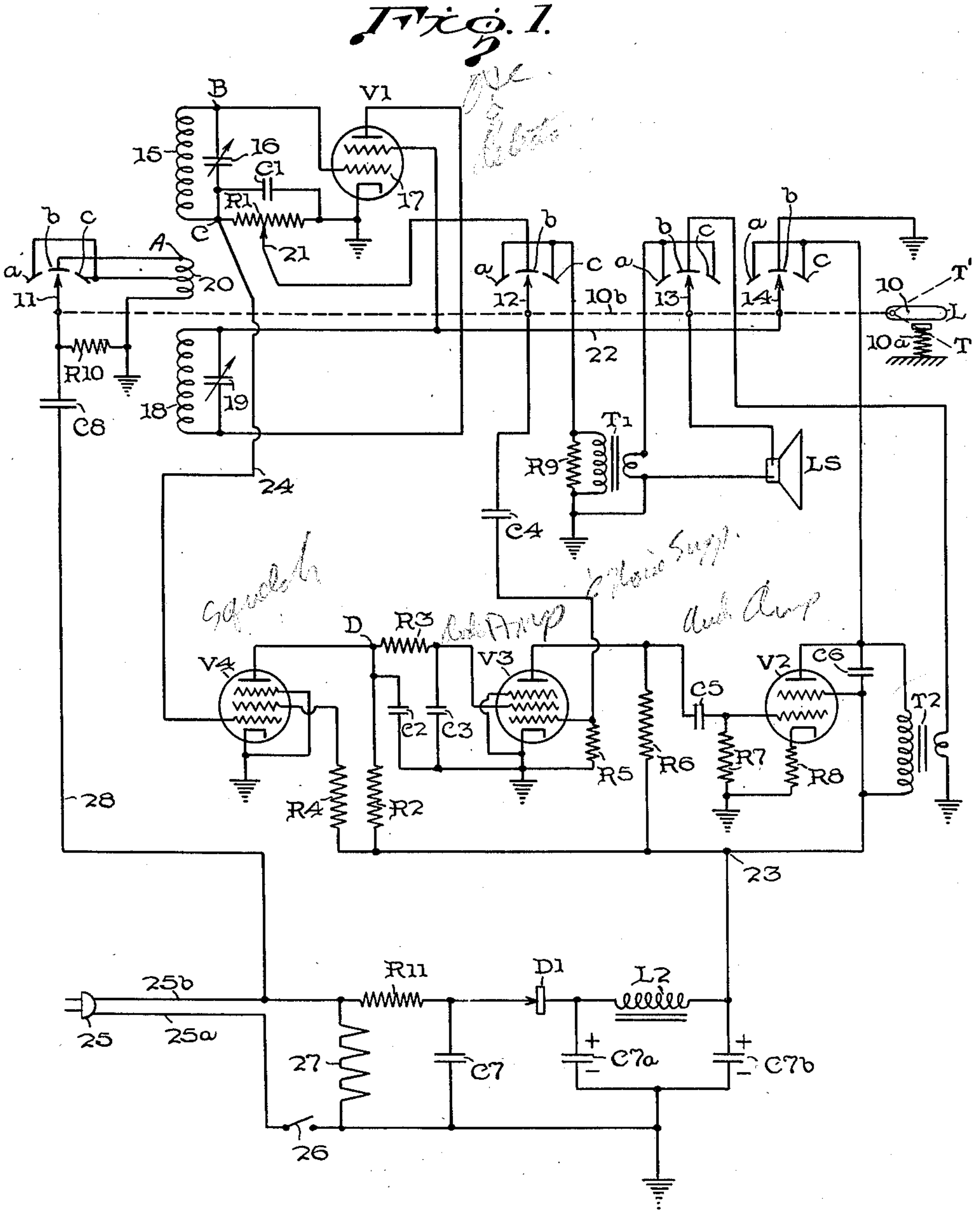
Figure 1 is a schematic wiring diagram.
Figure 2:
Figures 2, 3, 4 and 5 are waveforms of voltages produced by an intelligence modulated carrier wave taken at selected points in the circuit of Figure 1 when the apparatus is conditioned for reception.
Figure 6:
Figures 6, 7, 8 and 9 are waveform diagrams showing the effects of a series of typical noise pulses taken at the same points in the circuit as in Figures 2, 3, 4 and 5 when the apparatus is conditioned for reception.
Figure 3:
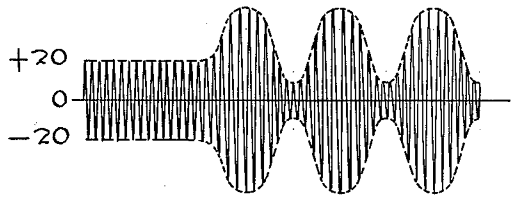

Referring now to the schematic wiring diagram, LS is the loudspeaker which also serves as a microphone when the apparatus is conditioned for transmitting. Tube V1 and the connected circuits serve as an oscillator when the apparatus is conditioned for transmitting, and this tube also operates as a diode detector when the apparatus is conditioned for receiving. Tubes V2 and V3 are used as audio amplifiers both for receiving and transmitting. Tube V3 also has an additional function as part of a novel noise-suppression circuit which will be described hereinafter. A "talk-listen" switch having an operating member 10 is normally biased to the listen position L in which the apparatus is conditioned for receiving. The switch must be manually held in its lower transmitting position T against the action of spring 10a, but it will remain in its upper transmitting position T' when moved to this position without being held.

The talk-listen switch is formed of four switch blades 11, 12, 13 and 14 joined by suitable ganging means represented at 10b for simultaneous operation by the operating member 10. Each switch blade is provided with three stationary contacts *a*, *b* and *c* arranged so that the blades engage all *a* contacts in the upper transmitting position T', all the *b* contacts are engaged in the "listen" position L and all *c* contacts are engaged in the lower transmitting position T.

The oscillator circuit is formed of a parallel resonant combination involving coil 15 and adjustable condenser 16 connected between the cathode and the control grid 17 of tube V1. A second parallel resonant combination formed of the coil 18 and adjustable condenser 19 is connected in the plate circuit of tube V1. Coils 15 and 18 are inductively coupled to each other and to a third coil 20 which is a coupling coil for coupling the apparatus to the power line.

A resistance R1 is connected between the parallel combination 15, 16 and the cathode of tube 17 and a by-pass condenser C1 is connected in shunt to this resistance. A slider contact 21 on resistance R1 is connected to switch contact 12*b*. Switch contacts 12*a* and 12*c* are connected to ground through a secondary winding of transformer T1. The screen grid of tube V1 and the parallel combination 18, 19 are connected to switch blade 14 through connection 22.

Switch contacts 13*a* and 13*c* are connected to ground through the primary winding of transformer T1, and switch blade 13 is connected to one terminal of the loudspeaker LS, the other terminal of the loudspeaker being connected to the grounded side of the primary winding of transformer T1. Switch contact 13*b* is connected to one terminal of the secondary winding of transformer T2, the other terminal of this winding being grounded. Switch contacts 14*a* and 14*c* are connected to the plate of tube V2 and through the primary winding of transformer T2 to the positive terminal 23 of the plate current source. Switch contact 14*b* is connected directly to ground.

Plate supply terminal 23 is connected to the plate of tube V4 through resistance R2, and the plate of V4 is connected to the screen grid of tube V3 through a resistance R3. Terminal 23 is also connected to the screen grid of tube V4 through resistance R4. The first or control grid of tube V4 is connected to the ungrounded end of resistance R1 by connection 24. The terminals of resistance R3 are connected to ground through condensers C2 and C3 respectively.

Switch blade 12 is connected to the first grid of tube V3 through condenser C4, and a leak resistance R5 connects this grid to ground. The plate of tube V3 is connected to positive terminal 23 through coupling resistance R6, and this plate is connected to the control grid of tube V2 through blocking condenser C5, the grid of V2 being connected to ground through leak resistance R7, and the cathode of this tube being connected to ground through biasing resistance R8. The screen grid of tube V2 is connected directly to positive terminal 23, and a by-pass condenser C6 is connected between screen grid and the plate of tube V2.

The apparatus is connected to the power system by a 2-conductor plug 25, the conductor 25*a* being grounded through a control switch 26, and the ungrounded conductor 25*b* being connected to the positive terminal 23 through a series resistance R11, a rectifier element D1 and an inductance L2. The heater elements for the various tubes used in the circuit are connected in series across the supply conductors 25*a* and 25*b* as shown at 27. A shunt condenser C7 is connected across the supply lines between resistance R11 and rectifier D1, and a pair of smoothing condensers C7*a* and C7*b* connect the two terminals of filter inductance L2 to ground.

Carrier waves are supplied from the power system, or to the system, over a connection 28 from the ungrounded line 25*b* through condenser C8 to switch blade 11, and from this blade to coupling coil 20 through switch contacts 11*a*, 11*b* or 11*c*. One end of coil 20 is grounded and the other end is connected to switch contact 11*b*, and switch contacts 11*a* and 11*c* are connected to a tap on coil 20. Resistance R10 connected between switch blade 11 and ground prevents sparking at the switch contacts.

Tubes V1 and V2 may be of the type 50B5 and tubes V3 and V4 may be of type 12AU6. The time constant of R1—C1 should be very short compared to the period of audio frequencies. For example, the time constant may be 0.00005 second. The time constant of R2—C2 should be relatively long with respect to the time constant of R1—C1. For example, it may be 0.05 second.

With the switch 10 in the receiving position L, and disregarding the noise suppressor circuit, the operation is as follows:

Any radio frequency signal appearing on the line 25*b* is impressed between the cathode and grid 17 of tube V1, through the coupling coil 20 and the tuned circuit 15—16. Assuming the carrier to be modulated, a rectified, negative voltage proportional to the envelope of the carrier appears across the grid leak resistor R1. A part of this voltage is fed to the control grid of tube V3 through switch blade 12 and condenser C4, where it is amplified by tube V3 and fed to amplifier tube V2 which drives the loudspeaker LS through transformer T2. It may be noted that in the receiving condition, the plate and screen electrodes of tubes V1 are disconnected from the plate current source and are connected to ground through switch contacts 14*b*.

The operation of the circuit with the switch 10 in transmitting position is as follows:

Plate voltage is now applied to the plate and the screen grid of tube V1 through switch contact 14*c* and this tube in conjunction with tuned circuits 15—16 and 18—19 then functions as an oscillator to generate the carrier wave. Loudspeaker LS is now connected to the primary winding of audio transformer T1 through switch contact 13*c*, and the output of this transformer drives the control grid of tube V3 through switch contact 12*c* and through condenser C4. Tubes V2 and V3 continue to act as audio amplifiers, transformer T2 serving as a modulator choke, and the audio output of tube V3 modulates the carrier generated by tube V1. Note that oscillator V1 is both plate and screen grid modulated.

In order to shunt out power line noise during listening periods, I have provided a novel noise-suppressor circuit which blanks the audio amplifier for substantially all radio frequency signals save continuous carrier waves transmitted from another set.

Most power line noise consists of unit voltage impulses of short duration but of relatively wide spacing and often of considerable amplitude.

Further, such noise may be continuous over a considerable period of time as for example, in the case of fast moving motor commutators, office machinery, etc. These noise voltages will shock excite the oscillatory input circuit and produce short, rapidly damped trains of radio frequency current which are detected and produce cracklings in the loudspeaker. So far as the input circuit is concerned it cannot differentiate such noise signals from an intelligence-modulated carrier. There is, however, one basic difference between the two, and that is that the noise signals are almost universally 100% modulated. To put it another way, the oscillations produced by the noise signals all die down to zero following each noise impulse. Except under extreme conditions of overmodulation, the intelligence-modulated carrier is never of zero value. My novel noise suppressor circuit makes use of this basic difference and may therefore be termed carrier-operated.

The noise suppressor circuit involves blanking means for normally maintaining one of the receiving amplifier tubes inoperative, and a carrier-operated storage device for overcoming the effect of the blanking means and rendering the amplifier tube operative. The blanking may be accomplished in a number of known ways, such as by controlling the bias on the control grid of the amplifier tube, or by reducing the voltage on the plate of the tube or on the screen grid of a multigrid tube. In the arrangement illustrated, the blanking is accomplished by reducing the voltage on the screen grid of the amplifier tube V3.

The blanking arrangement for amplifier tube V3 includes tube V4 which is a sharp cut-off high mutual conductance pentode. With no radio frequency signal being detected by tube V1, the control grid of tube V4 will be at a slight negative potential with respect to ground. The screen grid of tube V4, however, is maintained at a relatively high potential since it is connected directly to the positive side of the power supply through a resistor R4. For this reason, plate current will flow regardless of low plate potential, and the voltage at point D is maintained at or slightly below zero. This point is connected to the screen grid of audio amplifier V3 and this tube will not operate as an amplifier with zero screen potential. Thus, with no incoming carrier wave present, amplifier tube V3 is maintained cut-off or dead. With the appearance of a radio frequency carrier at point B however, a negative voltage drop is produced across R1 by the tube V1, functioning as a detector. This voltage is, of course, proportional to the envelope of the modulated carrier. As long as the carrier is not overmodulated, the control grid of tube V4 may be made sufficiently negative to be maintained steadily well below cut-off. Under these conditions, i. e., with tube V4 at cut-off, condenser C2 will charge positively through resistor R2 and the potential of the screen grid of tube V3 will rise rapidly in a positive direction to a point where this tube can function as an amplifier. The time constant of resistor R2 and condenser C2 may be of the order of 0.05 second and is relatively long with respect to the time constant of R1—C1. Figures 2, 3, 4 and 5 show oscillograms taken at the points A, B, C and D under the above conditions, that is, when receiving a modulated carrier wave.

Figure 7:
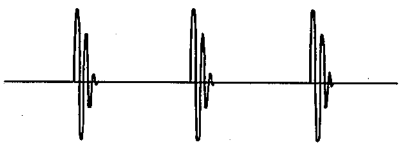
Figure 4:
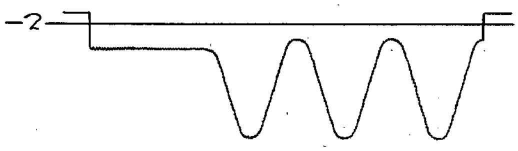
Figure 8:
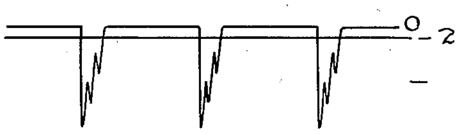
Figure 5:
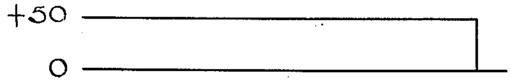
Figure 9:
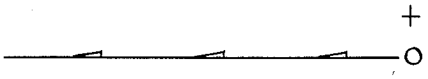

Figures 6, 7, 8 and 9 show oscillograms taken at these same points for a typical noise signal in the absence of a carrier wave. A series of unit voltage impulses (Fig. 6) at point A will produce a series of damped trains, of a few radio frequency cycles duration each, at point B (Fig. 7). With the time constant of resistor R1 and condenser C1 of the order of 0.00005 second, unidirectional negative pulses appear at point C, and as shown in Fig. 8, these pulses decay rather rapidly, that is, the decay time is so fast as generally to reach zero before the next pulse appears, even at high repetition frequencies well up in the high audio range. While these pulses cut off tube V4 for the duration of each pulse, and thus allow condenser C2 to start charging at the beginning of each pulse, the instant the pulse reaches zero, tube V4 begins conducting again so that condenser C2 discharges quickly through the low resistance of tube V4. Since the time constant of resistor R2-condenser C2 is very long compared to the duration of the noise pulse, the screen grid of tube V3 is not raised in potential enough to allow tube V3 to function as an amplifier. In other words, the time constant of detector circuit R1—C1 is relatively short with respect to the interval between noise pulses and condenser C2 is maintained in a discharged state throughout substantially the entire interval between noise pulses. The net result is that the screen of tube V3 remains substantially at zero for most noise voltages which appear on the power line, but rises and stays at a substantial value for a modulated carrier wave, so long as the latter is not in the vicinity of 100% modulated. Thus tube V4 and its circuit normally holds tube V3 in a dead condition, by keeping its screen voltage at zero in the absence of a received carrier, and it responds to an incoming carrier to render tube V3 operative after the carrier has continued for a certain time. In this arrangement, condenser C2 is a storage condenser and provides a controlling potential for tube V3 which continuously increases at a slow rate because of resistance R2 in response to the receipt of a carrier wave but which reduces to zero between noise impulses. The space-current path of tube V4 forms a discharge path of normally low resistance connected across condenser C2, and this tube constitutes a voltage-responsive device for increasing the resistance of the discharge path in accordance with the voltage of the detected energy.

It will be advantageous in securing complete blanking of tube V3 to use a small positive cathode bias on this tube so that its screen will be driven below zero when current flows in tube V4. The network formed of resistors R2 and R3 and condensers C2 and C3 serves to filter out any audio-frequency voltage which may appear at D when a weak carrier, somewhere near the threshold value for operation of the system, is present. If relatively large carrier amplitudes are consistently to be expected, the second filter stage R3—C3 may be omitted, and the screen of tube V3 will be connected directly to the plate of tube V4.

The noise-suppressor circuit is not limited in its application to a transceiver in which the oscillator embodies the detector circuit, but it can be used in a system in which the detector circuit is separate from the oscillator.

When the set is conditioned for transmitting, the grid leak bias on resistor R1 is sufficient to hold tube V4 at cut-off and thus allow tube V3 to function as an amplifier. Overmodulation can, of course, blank the set while transmitting, but this almost never occurs during normal operation.

Switch blade 11 changes taps on coupling coil 20 so that transmission of signal power to the line takes place at an impedance of the order of 4 ohms, while reception of power from the line is through an impedance of the order of 100 ohms. This allows for efficient transmitting operation in the case of low shunt impedance, e. g., heavy power line loading, or efficient receiving over high series impedance, e. g., in the case of long lines.

The oscillatory circuit 15—16 is made to tune very closely to the same frequency whether transmitting or receiving by using a high resistance grid-leak resistor R1 and a high grid excitation voltage on tube C1.

The embodiments of the invention in which an exclusive right is claimed are defined as follows:

1. In a signalling device adapted for both transmission and reception, in which an electron tube is connected in an oscillator circuit to generate a carrier wave on transmission and is connected in a detector circuit to rectify the received signals and noise impulses on reception, and in which an electron tube amplifier serves to amplify the audio currents detected by said electron tube during reception and amplifies audio currents from a microphone during transmission, an arrangement for discriminating against noise impulses during periods when no carrier wave signals are received comprising, a detector circuit having a relatively short time constant in respect to the interval between noise impulses, blanking means normally maintaining said amplifier inoperative, potential storage means connected to an electrode of said amplifier in a direction tending to render said amplifier operative, means controlled by detected energy from said detector circuit for controlling the charging and discharging of said storage means, said charge controlling means including a circuit of relatively long time constant for charging said condenser in response to received energy and a circuit of relatively short time constant for discharging said condenser during periods of no received energy.

2. A signalling device according to claim 1 in which said amplifier includes a screen-grid amplifier tube and said blanking means normally maintains the screen-grid of said tube substantially at zero potential and said storage means raises the potential of said screen-grid to render said tube operative.

3. A signalling device according to claim 1 wherein said oscillator circuit includes a parallel tuned circuit connected between the grid and the cathode of the oscillator tube and a resistance interposed in the connection between the cathode and said tuned circuit, and said amplifier includes a screen-grid amplifier tube, a connection between the control grid of said amplifier tube and said resistance, the input of said blanking means being connected to said resistance, and the output of said blanking means being connected to the screen-grid of said amplifier tube and normally maintaining said screen grid at substantially zero potential.

4. In a carrier wave signalling system, a receiving arrangement for discriminating between noise impulses and modulated carrier wave signals comprising, in combination, a tuned circuit energized by received signals including noise signals, a detector circuit energized by said tuned circuit and having a relatively short time constant in respect to the interval between noise impulses, an electron tube amplifier controlled by energy from said detector circuit, blanking means normally maintaining said amplifier inoperative, a storage condenser connected to an electrode of said amplifier in a direction tending to render said amplifier operative, a charging circuit for said condenser having a relatively long time constant, a discharge path of low time constant connected across said condenser, and means controlled by detected energy from said detector circuit for increasing the resistance of said discharge path.

5. In a carrier wave signalling system, a receiving arrangement for discriminating between noise impulses and modulated carrier wave signals comprising, in combination, a tuned circuit energized by received signals including noise signals, a detector circuit energized by said tuned circuit and having a relatively short time constant in respect to the interval between noise impulses, an electron tube amplifier controlled by energy from said detector circuit, blanking means normally maintaining said amplifier inoperative, potential storage means connected to an electrode of said amplifier in a direction tending to render said amplifier operative, means controlled by detected energy from said detector circuit for controlling the charging and discharging of said storage means, said charge controlling means including a circuit of relatively long time constant for charging said condenser in response to received energy and a circuit of relatively short time constant for discharging said condenser during periods of no received energy.

6. In a carrier wave signalling system, a receiving arrangement for receiving modulated carrier wave signals and for discriminating against relatively widely spaced noise impulses received during non-signalling periods, said arrangement comprising a detector circuit of low time constant with respect to the interval between noise impulses for detecting the energy of said carrier wave signals and noise impulses, an electron tube amplifier for amplifying the detected energy in said detector circuit, blanking means normally maintaining said amplifier inoperative, a storage condenser connected to an electrode of said amplifier in a direction tending to render said amplifier operative, a charging circuit for said condenser having a relatively long time constant, a discharge path of low time constant connected across said condenser, and voltage-responsive means included in said discharge path and controlled by the detected energy in said detector circuit for increasing the resistance of said discharge path in accordance with the voltage of said detected energy.

7. In a system for the reception of carrier-wave signals in the presence of noise impulses, in which said signals and impulses are detected in a detector circuit and the detected energy is amplified by an electron tube amplifier, the improvement comprising an arrangement for eliminating the effects of noise impulses received during periods when carrier wave signals are absent, said arrangement comprising, a blanking device including a source of voltage connected to one electrode of said amplifier and serving normally to maintain said amplifier inoperative, a potential storage condenser connected to an electrode of said amplifier in a direction tending to render said amplifier operative, a charging circuit connecting said condenser to a source of charging voltage through a resistance of relatively high value, a discharging circuit connected directly across said condenser and including a voltage-responsive variable resistance device normally having a resistance value which is relatively low with respect to the resistance of said charging circuit, and a connection from said detector circuit to said voltage-responsive resistance device and operating to increase the resistance of said device in accordance with the voltage of the detected energy.

8. A signalling system according to claim 7 in which said amplifier includes a screen-grid tube, said blanking device being connected to the screen-grid of said tube for normally maintaining the screen-grid substantially at zero potential, and said storage condenser being connected to said screen-grid to raise the potential thereof upon the charging of said condenser.

9. A circuit for deriving a control voltage in response to carrier-wave energy, and being non-responsive to relatively widely spaced pulses of noise energy, comprising in combination a detector circuit for rectifying said carrier-wave and said noise pulses, a condenser, a circuit for charging said condenser comprising a source of direct current and a high resistance connected in series with said condenser, a discharging circuit connected across said condenser and including the space-current path of a normally conducting vacuum tube having a control grid, a connection from said detector circuit for applying to the grid of said tube a negative voltage derived from said rectified energy and thereby to render said tube non-conductive, said detector circuit having a relatively short time constant with respect to the interval between noise pulses whereby, in the absence of carrier-wave energy, said condenser is maintained in a discharged state substantially throughout the interval between noise pulses.

10. A circuit according to claim 9 wherein said charging circuit has a long time constant with respect to the interval between noise pulses whereby, in the absence of carrier-wave energy, said condenser is charged to a voltage of low value in response to each noise pulse and, upon receipt of carrier-wave energy, said condenser is charged to a voltage of progressively increasing value.

11. In a signalling device adapted for both transmission and reception, the combination of an oscillation generator including an electron tube having cathode, grid and plate electrodes, and a parallel tuned circuit connected between the cathode and the grid of said tube; a resistance interposed in the connection between said cathode and said tuned circuit; an audio amplifier; a microphone capable of operation as a loudspeaker; a multi-blade switch having a transmitting position and a receiving position; means controlled by said switch in transmitting position for energizing said oscillation generator to produce electric oscillations in said tuned circuit and for de-energizing said generator in the receiving position of said switch; means controlled by said switch in its transmitting position for supplying to the input of said amplifier signals derived from said microphone, means controlled by said switch in its receiving position for supplying to the input of said amplifier signals derived from said resistance; means controlled by said switch in transmitting position for supplying signals from the output of said amplifier to said oscillator to modulate the oscillations generated in such tuned circuit, and means controlled by said switch in the receiving position for supplying signals from the output of said amplifier to said microphone.

12. In a signalling device adapted for both transmission and reception, the combination of an oscillation generator including an electron tube having cathode, grid and plate electrodes, and a parallel tuned circuit connected between the cathode and the grid of said tube; a resistance interposed in the connection between said cathode and said tuned circuit; an electron-tube audio amplifier including an output transformer having its primary winding connected in the plate circuit of the last stage thereof; a microphone capable of operation as a loudspeaker; a multi-blade switch having a transmitting position and a receiving position; a connection from one blade of said switch to the anode of said oscillator tube, means controlled by said one blade in the transmitting position of said switch for connecting the anode of said oscillation tube to a source of plate current through said primary winding, and means controlled by said one blade for grounding the anode of said oscillation tube in the receiving position of said switch; a connection from a second blade of said switch to said microphone, means controlled by said second blade in transmitting position for effecting transmission of signals from said microphone to the input of said audio amplifier, means controlled by said second blade in receiving position for connecting said microphone to the secondary of said output transformer; a connection from a third blade of said switch to the input of said audio amplifier, means controlled by said third blade in the transmitting position for effecting the transmission of signals from said microphone to the input of said amplifier, and a connection completed by said third blade in receiving position for supplying signals from said resistance to the input of said amplifier.

JOHN R. COONEY.

REFERENCES CITED

The following references are of record in the file of this patent:

UNITED STATES PATENTS

| Number | Name | Date |
|---|---|---|
| 2,114,718 | Levy | Apr. 19, 1938 |
| 2,143,563 | Levy | Jan. 10, 1939 |
| 2,263,633 | Koch | Nov. 25, 1941 |
| 2,497,592 | Erickson | Feb. 14, 1950 |

Certificate of Correction

Patented March 24, 1953 Patent No. 2,632,812

JOHN R. COONEY

It is hereby certified that it appears that mistakes have been made in the above numbered patent and a showing has been made that such mistakes occurred in good faith and were not the fault of the Patent Office, said mistakes requiring correction as follows:

Column 7, lines 39 and 41, and column 8, lines 26 and 28, for "condenser" read *potential storage means*.—

The said patent should be read as though corrected as specified.

Signed and sealed this 11th day of August, A. D. 1953.

[SEAL]

ARTHUR W. CROCKER,
*Assistant Commissioner of Patents.*